United States Patent [19]

Trujillo et al.

[11] Patent Number: 6,159,887
[45] Date of Patent: Dec. 12, 2000

[54] VANADIUM TRAPS FOR CATALYST FOR CATALYTIC CRACKING

[75] Inventors: Carlos Alexander Trujillo, Santafe de Bogotá; Uriel Navarro Uribe, Bucaramanga; Luis Alfredo Oviedo Aguiar, Santafe de Bogotá, all of Colombia

[73] Assignees: Empresa Colombiana de Petroleos Ecopetrol; Universidad Nacional de Colombia, both of Santafe de Bogotá, D.C., Colombia

[21] Appl. No.: 09/143,367

[22] Filed: Aug. 28, 1998

[30] Foreign Application Priority Data

Oct. 2, 1997 [CO] Colombia ............................ 97-57402

[51] Int. Cl.⁷ .................................................... B01D 33/00
[52] U.S. Cl. ................................ 502/64; 502/60; 502/79; 502/208; 502/209; 502/521
[58] Field of Search .............................. 502/64, 60, 208, 502/209, 521, 79

[56] References Cited

U.S. PATENT DOCUMENTS

| | | |
|---|---|---|
| 3,977,963 | 8/1976 | Readal et al. . |
| 4,025,458 | 5/1977 | McKay . |
| 4,198,320 | 4/1980 | Chester et al. . |
| 4,255,287 | 3/1981 | Bertus et al. . |
| 4,256,654 | 3/1981 | Schlinger et al. . |
| 4,290,919 | 9/1981 | McKay et al. . |
| 4,295,955 | 10/1981 | Tu . |
| 4,337,144 | 6/1982 | Yoo . |
| 4,377,494 | 3/1983 | Bertus et al. . |
| 4,377,504 | 3/1983 | Roberts et al. . |
| 4,397,767 | 8/1983 | Roberts et al. . |
| 4,430,199 | 2/1984 | Durante et al. . |
| 4,432,890 | 2/1984 | Beck et al. . |
| 4,451,355 | 5/1984 | Mitchell et al. . |
| 4,464,250 | 8/1984 | Myers et al. . |
| 4,465,588 | 8/1984 | Occelli et al. . |
| 4,466,884 | 8/1984 | Occelli et al. . |
| 4,473,463 | 9/1984 | Bertus et al. . |
| 4,490,299 | 12/1984 | Bertus et al. . |
| 4,515,683 | 5/1985 | Beck et al. . |
| 4,522,704 | 6/1985 | Bertsch . |
| 4,664,847 | 5/1987 | Williams . |
| 4,724,227 | 2/1988 | Kukes et al. . |
| 4,750,988 | 6/1988 | Mitchell et al. . |
| 4,816,135 | 3/1989 | Martinez et al. . |
| 4,824,815 | 4/1989 | Kugler . |
| 4,847,225 | 7/1989 | Lussier . |
| 4,854,960 | 8/1989 | Lindgren et al. . |
| 4,867,863 | 9/1989 | Herbst et al. . |
| 4,889,615 | 12/1989 | Chin et al. . |
| 4,895,636 | 1/1990 | Chen et al. . |
| 4,900,428 | 2/1990 | Mester . |
| 4,920,087 | 4/1990 | Wormsbecher . |
| 4,921,824 | 5/1990 | Chin et al. . |
| 4,929,583 | 5/1990 | Pasek et al. . |
| 4,944,864 | 7/1990 | Kugler . |
| 4,944,865 | 7/1990 | Occelli et al. . |
| 4,971,766 | 11/1990 | Chen et al. . |
| 4,980,050 | 12/1990 | Huh et al. . |
| 4,988,654 | 1/1991 | Kennedy et al. . |
| 4,990,240 | 2/1991 | Pasek et al. . |
| 5,001,096 | 3/1991 | Chu et al. . |
| 5,002,653 | 3/1991 | Kennedy et al. . |
| 5,019,241 | 5/1991 | Forester . |
| 5,057,205 | 10/1991 | Chin et al. . |
| 5,071,806 | 12/1991 | Pecoraro . |
| 5,071,807 | 12/1991 | Kennedy et al. . |
| 5,077,263 | 12/1991 | Henzel . |
| 5,141,624 | 8/1992 | Liao et al. . |
| 5,300,469 | 4/1994 | Deeba et al. . |
| 5,304,299 | 4/1994 | Kumar . |
| 5,324,416 | 6/1994 | Cormier et al. . |
| 5,364,516 | 11/1994 | Kumar et al. . |
| 5,384,041 | 1/1995 | Deeba et al. . |
| 5,603,823 | 2/1997 | Kim . |
| 5,641,395 | 6/1997 | Hettinger, Jr. et al. . |

FOREIGN PATENT DOCUMENTS 2145345  3/1985  United Kingdom .

OTHER PUBLICATIONS

Lippens, B. C., et al., Studies on Pore Systems in Catalysts V. The t Method, *Journal of Catalysis* 4, 310–323 (1965).

Neilsen, et al., "Fluid Catalytic Cracking: Science and Technology," Studies in Surface Science and Catalysis, vol. 76, Elsevier Publishers, 1993, pp. 339–384.

Kurihara, et al., "Luminiscence as a Probe of Metal Effects in Fluidized Cracking Catalysts," Fluid Catalytic Cracking II: Concepts in Catalytic Design, vol. 452, 1991, A.C.S. Symposium Series, pp. 224–241.

Anderson, et al., "Luminiscence Probes of Vanadium–Contaminated Fluid Cracking Catalysts," J. Catal., vol. 118, 1989, pp. 31–42.

Suib, et al., "The Effect of Tin and Antimony Addition on the Performance of Dual Function Cracking Catalyst (DFCC) Mixtures," J. Catal., vol. 325, 1992, pp. 325–331.

*Primary Examiner*—Steven P. Griffin
*Assistant Examiner*—Christina Ildebrando
*Attorney, Agent, or Firm*—Smith Gambrell & Russell, LLP

[57] ABSTRACT

A catalytic composition useful in the catalytic-cracking of hydrocarbons is described, which contains at least one agent causing the inactivation of vanadium, which may be present in the hydrocarbons as a contaminant. These agents obtain inactivation of vanadium without substantial loss of catalytic activity and selectivity.

16 Claims, No Drawings

VANADIUM TRAPS FOR CATALYST FOR CATALYTIC CRACKING

SUBJECT MATTER OF THE INVENTION

It is an object of the invention to provide catalytic compositions having ability to process charges having high contents of metals, particularly vanadium, in order to immobilize said metals, without substantial loss in their catalytic activity and selectivity. It is another object of this invention to provide the previously existing catalytic compositions with additives or traps for retaining vanadium in the environment of the catalytic-cracking process of hydrocarbons.

TECHNICAL STATUS

Whilst it has been a commercial subject and a successfully demonstrated issue that the use of antimony compounds in the Catalytic Cracking Units (CCU) decreases significantly the nickel-dehydrogenating activity, diminishing the production of hydrogen and coke, the vanadium control has given rise to serious drawbacks and difficulties. Usually, said control is performed by increasing the addition of fresh catalyst, in order to avoid that the pentavalent vanadium. Among these diluents and materials it can be mentioned:

The bismuth and manganese organic and inorganic compounds (U.S. Pat. No. 3,977,963); the antimony compounds having organic anions containing phosphorus and sulfur (U.S. Pat. No. 4,025,158); the colloidal dispersions of silica and/or alumina added to catalyst formulation or as independent particles (U.S. Pat. No. 4,198,320); the oxides, salts and/or the organometallic compounds of the metals Mg, Ca, Sr, Ba, Sc, Y, La, Ti, Zr, Hf, Nb, Ta, Mn, Fe, In, Tl, Bi, Te; the rare earth elements and the lanthanide series of elements, (U.S. Pat. No. 4,432,890); the organometallic compounds of tin with phosphorus and sulfur (U.S. Pat. No. 4,397,767); the calcium compounds such as $Ca_3Ti_2O_7$, $CaTiO_3$ (perovskite), $CaTi_2O_5$, $CaTi_4O_9$, $CaZrTi_2O_7$, (Zr, Ti) $O_2$ tazheranite, $CaZrO_3$, $Ca_{0.15}Zr_{0.85}O_{1.85}$, $CaZr_4O_9$ (U.S. Pat. No. 4,451,355); $CaO/TiO_2$, $CaO/ZrO_2$, $CaO/TiO_2/ZrO_2$ (U.S. Pat. No. 4,520,120); $CaCO_3$, $CaSi_2O_5$, dolomite, $CaSO_4$, $CaHPO_4$, $CaCl_2$, $CaSO_3$ (U.S. Pat. No. 4,750,988).

The oxides of rare-earht elements (U.S. Pat. Nos. 5,077,263; 5,001,096; 4,900,428; 4,515,683; 4,921,824; 5,304,299 and 5,364,516); the organometallic compounds of phosphorus and boron (U.S. Pat. No. 4,430,199); the addition of strontium compounds (such as strontium carbonate) to the composition of the catalyst matrix (U.S. Pat. Nos. 4,824,815, 4,944,864 and 4,929,583); the spinel-mullite and gamma-alumina compositions which can contain up to 10% of an alkaline-earth oxide (U.S. Pat. No. 4,847,225); the mixing of zeolite ZSM-5 to the catalyst with the purpose of trapping vanadium and sodium (U.S. Pat. No. 4,867,863); the addition of the mixture of magnesium hydrocalcite and dehydrated alumina to the catalyst particles with the dual-purpose of trapping both vanadium and sulfur (U.S. Pat. No. 4, 889,615).

The alumina and the spongy coke (U.S. Pat. Nos. 4,895,636; 4,971,766; 4,980,050); the incorporation of magnesium oxide (U.S. Pat. Nos. 4,920,087, 4,944,865) into the catalyst composition; likewise, compounds such as $BaCO_3$, $BaTiO_3$, $BaZrO_3$, $La_2(CO_3)_3$, $Ce_2(CO_3)_3$, $CeTiO_4$, $CeZrO_4$, $SrTiO_3$, $SrZrO_3$ which operate as vanadium traps within the catalyst composition (U.S. Pat. Nos. 4,990,240 and 4,929,583). The mixture of materials containing calcium and magnesium such as the dolomite, sepioilite, the amorphous calcium and magnesium silicates, the calcium and magnesium oxides, the acetate, carbonates and the calcium and magnesium subcarbonates; on which grounds the dolomite and the sepioilite added to the catalyst formulation, are preferred, (U.S. Pat. No. 4,988,654); or as additives in the form of free particles (U.S. Pat. Nos. 5,002,653 and 5,071,807).

It has been also protected under Pat. the use of clays having some magnesium content (U.S. Pat. No. 5,071,806); the magnesium aluminate in spinela phase which traps at the same time vanadium and sulfur (U.S. Pat. Nos. 5,057,205 and 5,324,416); the magnesium oxide supported on alumina (U.S. Pat. No. 5,141,624). Other chemical elements and their oxides which have been protected under Pat. in connection with their ability to immobilize the vanadium in a Catalytic Cracking Unit (CCU) are: germanium (U.S. Pat. Nos. 4,490,299 and 5,019,241); gallium (U.S. Pat. No. 4,377,504); tellurium, cadmium and zinc (U.S. Pat. No. 4,522,704); indium (U.S. Pat. No. 4,256,654); aluminium (U.S. Pat. No. 4,337,144); barium (U.S. Pat. No. 4,377,494); boron (U.S. Pat. No. 4,295,955); tungsten (U.S. Pat. No. 4:,290,919); lithium (U.S. Pat. No. 4,664,847), and even it has been sought to use also vanadium by itself (U.S Pat. No. 4,854,960).

It has been mentioned in Pat. literature that the addition of some diluents to the catalytic cracking catalyst significantly increases the vanadium resistance. In this manner it has been claimed that the addition of alumina (U.S. Pat. No. 4,466,884) and/or of alumina-containing materials, with or without vanadium-deactivating agents (such as tin or antimony) (U.S. Pat. No. 4,465,588), or the addition of natural zeolites, (U.K. Patent. No. 2,145,345), is able to partially inhibit the damaging effects caused by the nickel and vanadium on the activity and selectivity of the catalysts in the Catalytic Cracking Units.

The addition of diluents to the catalyst gives rise to the drawback consisting in increasing the available area for the nickel dispersion and that one for the vanadium in itself and, when they are more scattered, it is increased the coke and hydrogen production. Many of the materials that may have the ability to act as vanadium traps are alkaline in nature and their effectiveness for the vanadium capture is regarded as severely decreased because of the sulfuric acid presence, which is brought about in the generator because of the reaction between the sulfur oxides ($SO_x$) and the water vapor.

The severe conditions under which the catalytic-cracking process is carried out make it particularly difficult the vanadium blocking. In spite of a great deal of investigations carried out on the matter, no substance has been found out which meets all of the requirements about an ideal trap for retaining the vanadium. Said requirements can be enumerated as follows:

That the substance be stable at a temperature up to 800° C. in an oxidizing environment (regenerator) and in the presence of about 20% partial pressure of water vapor and from 60 to 2000 ppm sulfuric acid.

That the substance be stable at a temperature of 550° C. in a strongly reducing environment (reactor) and in the presence of water vapor (stripper).

That the substance possesses greater affinity for the vanadium than for the zeolite and for the catalyst components.

The amount of substance required for the effective protection of the catalyst, must be low enough to avoid excessive dilution of the catalyst and in that way avoiding in consequence its loss of activity and selectivity.

The rate of vanadium capture must be high enough to avoid damaging the catalyst.

The substance ought to maintain its vanadium-capture power whilst it remains within the cracking unit.

If the substance contains metallic elements, these must not be interchanged by the zeolite cations.

The substance ought not to be damaging either for the catalyst or for the metallic structure of the unit.

The substance ought to be able to be incorporated within the catalyst particle during its production (integral particle), and/or to be able to be prepared in the form of particles able to be fluidized having good abrasion strength, in order that they can flow together with the catalyst in the unit (dual particle).

The substance must be cheaper than the catalyst, since it is charged to the catalyst inventory in order to decrease the fresh catalyst addition and in this manner to diminish the operation cost.

It must be acceptable from the viewpoint of environmental preservation; the substance must not need particular handling conditions, it must not generate toxic materials during its preparation, nor can it be apt to be converted into a dangerous contaminant after being used.

It must not possess dehydrogenating activity nor facilitate the nickel and vanadium dehydrogenating action.

The last mentioned condition is essential in the selection of these materials, inasmuch as substances like the alumina and some clays, which fulfill the majority of the conditions, have limited uses because they do not fulfill the last mentioned requirement, increasing the coke and hydrogen production.

This is so because the catalytic cracking units are operated by preserving the thermal balance, thus avoiding that the heat generated in the regenerator to exceed the catalyst-stability limit as well as the mechanical limitations of the unit. A greater nickel and vanadium dispersion because of the trap introduction causes it to yield more coke and less gasoline. More coke means a higher temperature in the generator, which is automatically controlled by the unit thus decreasing the circulation of equilibrium catalyst; this latter is translated into a minor severity of the reaction (lesser catalyst/charge ratio), thus affecting the proportion of acid sites by unit of charge and decreasing the profile of yields of the unit. If a vanadium inhibitor does not meet this condition, it is impossible to control the activity of these metals.

DESCRIPTION OF THE INVENTION

This invention is specifically related to the use of activity-suppressing substances and metal traps in order to decrease the damaging effects of the vanadium and nickel on the catalytic-cracking catalysts or FCC (Fluid Catalytic Cracking), used in the catalytic cracking process of hydrocarbons and more particularly it relates to the catalytic compositions capable of converting petroleum heavy fractions into gasoline and other valuable products.

The catalytic-cracking process is used to convert petroleum-heavy fractions into fuels fit for vehicles of transportation and other products having petrochemical interest. The charge for the catalytic-cracking units (CCU) contains small amounts of metallic compounds which accumulate on the catalyst and impair the process outputs. In general, the greater the average molecular weight (MW) in the charge, the greater will be the content of metals like vanadium, nickel, iron and copper. In the petroleum industry there is the world-wide trend toward subjecting to catalytic cracking increasingly heavier and contaminated charges (greater MW), mainly because of the shortage of the light charges, the greater economic income-yield capacity in the case of processing these heavy charges, the difficulty for handling and for commercializing these residues and because of environmental problems generated by incomplete processing thereof.

The catalyst is generally made up of particles having diameters comprised between 20 and 150 microns, with an average diameter of about 70 microns. It is composed of a zeolite (crystalline aluminosilicate), generally of the Y type, imbedded into a silica and alumina matrix as the main components. The zeolite, which is the most active part of the catalyst, is liable to be poisoned and made inactive by the vanadium which contaminates the charge.

In the catalytic cracking process, the catalyst cyclically flows between the reactor and the generator; in each cycle the catalyst takes a delay of a few seconds in the reactor and of about of 7–15 minutes in the regenerator (depending on its design). The reaction takes place when the hot catalyst issuing from the generator meets the charge, at the elevator base, at a blending temperature which can vary between 500–560° C. The reaction products, the load which did not react and the spent catalyst (catalyst with coke) are conveyed toward the reactor cyclones where the catalyst is removed from the hydrocarbons. Before conveying the spent catalyst to the regenerator, it is passed through the stripper where, by means of a water-vapor stream, the hydrocarbon trapped into the catalyst pores or interstices is released. The catalyst issuing from the stripper is moved to the regenerator where the coke in the air presence is became oxidized into $CO_2$, $CO$, $H_2O$, small amounts of $SO_x$ and $NO_x$. The heat evolved from this combustion is enough to rise the regenerator temperature up to the order of between 650–790 ° C. The hot catalyst is transferred to the reactor wherein a new cycle is started.

Among the metals present in the petroleum, the vanadium and nickel are the more harmful ones and their concentration in the balance catalyst (the catalyst which moves in the inventory of the commercial unit) makes it necessary to daily add an amount of fresh catalyst. It is well known that the vanadium, even in weak concentrations, has an effect on the catalyst activity and selectivity making the zeolite inactive and promoting the production of coke and hydrogen at the expense of valuable products such as the gasoline. The nickel does not alter the catalyst activity, but it has an effect on its selectivity yielding great amounts of hydrogen and coke, which are able to mechanically limit the unit operation.

During the development of this invention it was found a chemical reaction, which until now has not been reported in the literature, by means of which the vanadium is held immovable in the firm of stable compounds of $V^{iv}$ and $V^v$ with different types of phosphorus compounds of bivalent and trivalent metals. It was found that the $V_2O_5$ reacts in oxidizing atmosphere with the following phosphorus inorganic compounds, in accordance with reactions which are the reason of this invention: $M(PO_3)_2$, $M_2P_2O_7$, $M_3(PO_4)_2$, $M_{10}(OH)_2(PO_4)_6$, $M(H_2PO_4)_2$, $MHPO_4$, $3M_3(PO_4)_2 \cdot MCO_3$, $M(H_2PO_2)_2$, $MHPO_3$, $M(PO_2)_2$, $M_2P_2O_7$, $M_3(PO_4)_2$, $M_{10}(OH)_2(PO_4)_6$, $M(H_2PO_4)_2$, $MHPO_4$, $3M_3(PO_4)_2 \cdot MCO_3$, $M(H_2PO_2)_2$, $MHPO_3$, $M(PO_2)_2$, $M_2P_2O_6$ and $A(PO_3)_3$, wherein M stands for a bivalent metal such as: Be, Mg, Sr, Ba, Zn, Cd, and Pb, and A represents a trivalent metal such as Al, Ga, In, As, Sb, Bi, La, Ce, Pr, Nd, Pm, Sm, Eu, Gd, in order to produce the new compounds wherein, as stated above, the vanadium is stabilized in the form of $V^{iv}$ and $V^v$.

The phosphorous compounds which afford the best results for the direct applications of immobilizing the vanadium in the catalytic-cracking catalyst, are those ones wherein the phosphorus is encountered in its pentavalent condition and the metal is barium, such as $Ba(PO_3)_2$, $Ba_2P_2O_7$, $Ba_3(PO_4)_2$, $Ba_{10}(OH)_2(PO_4)_6$ and mixtures thereof.

In this invention it was found that these compounds and their homologous of the aforementioned metals, react with the $V_2O_5$ in accordance with the following reaction still unknown in the chemical literature:

$$2V_2O_5 + 4M\,(PO_3)_2 \rightarrow 4MVP_2O_8 + O_2 \qquad (1)$$

wherein M=divalent metal from the group formed by Be, Mg, Ca, Sr, Ba, Zn, Cd, Pb.

In the compound $BaVP_2O_8$ and in the homologous compounds of the above pointed out metals the vanadium is found as $V^{iv}$. These compounds have not yet been made known in the chemical literature. While the above equation (1) has been written for the metaphosphates, the reaction, however, takes place also with compounds which contain, in molar proportion minor phosphorus content such as the pyrophosphates and orthophosphates, in this case it is formed also the compound $NVP_2O_8$ and the metal M in excess reacts with more $V_2O_5$ in order to yield M vanadates, such as the orthovanadates $M_3(VO_4)_2$, pyrovanadates $M_2V_2O_7$, methavanadates $MVO_3$, $M_3V_2O_8$, $MV_2O_6$ and some other compounds wherein the vanadium is stabilized as $V^v$.

The reaction (1) can be followed by mass loss or by means of spectroscopy of electronic "spin" resonance (ESR). The $V^{iv}$ has in its electronic structure an unpaired electron, by which reason the electronic "spin" has a net value different from zero and it can be detected and quantified by ESR. The reaction of the $V_2O_5$ with some of the above-mentioned compounds was studied. The reactants were mixed in a mortar in a Vanadium/Phosphorous molar ratio (V/P)=0.1, later on they were subjected for 36 hours to a temperature of 700° C.; the reaction products were analyzed by means of ESR and the results are described as $V^{iv}$ percent with respect to vanadium total content in the reaction mixture.

The amount of stabilized vanadium as $V^{iv}$ depends on the Metal/Phosphorus (M/P) reaction and on the cation M nature, the Barium II being the more active cation. The $V_2O_5$ reaction with the phosphates takes place also in the presence of water vapor. The stabilization of the vanadium as $V^{iv}$ is attained even in oxidizing atmosphere at high temperatures.

INDUSTRIAL APPLICATIONS OF THE INVENTION

The invention has application in the catalytic-cracking process of hydrocarbons wherein the vanadium present in the charges poisons and destroys the components of the catalyst used in the process, reducing both its activity and the yields of valuable products such gasoline. In order to avoid the poisoning and destruction of the catalyst it is required to use additives which contend with the catalyst for the vanadium. In this invention it was found out that the application of the phosphates and the different above described phosphorus compounds, allows them to react with the vanadium thus forming stable compounds under the conditions of the catalytic-cracking process, in which the vanadium is stabilized in its oxidation states IV and V.

This manner of vanadium immobilization offers advantages with regard to the traditional mechanism acid-base, since it is avoided or minimized the competition of the sulfuric acid for the normally used vanadium traps. In addition, the $V^{iv}$ has no dehydrogenating activity, subject which was already pointed out as one of the more important aspects for the process.

The barium pyrophosphate $Ba_2P_2O_7$, fulfills the majority of conditions required by an ideal trap for the vanadium capture under the severe conditions of the catalytic cracking process described in connection with the technical status:

It withstands the temperatures and the pressure environment found in the catalytic-cracking process.

It does not react either with the zeolite or with the catalyst components.

It offers good activity and affinity for the vanadium.

The reaction with the vanadium is fast.

It does not deactivate with the residence time in the unit.

Because of its very low solubility it is not turned into a dangerous contaminant after use.

It is very inexpensive and has neither dehydrogenating activity nor makes it easy the nickel action inasmuch as it has low superficial area.

It is insoluble enough so as to not to flocculate the dispersions of zeolite, clay and the rest of the catalyst components which are subjected to aspersion drying, because of which they can easily be involved in the catalyst formulation.

These phosphorus compounds can be included in the catalyst formulation or can be applied to the equilibrium catalyst as additives during the CCU operation. The advantages involved by means of the addition of these compounds to the catalyst formulation or mixture of the catalyst with the additive formed by these compounds, will be easily understood by the workers skilled in the art and the commercial catalyst providers.

The preparation of these compounds can be carried out by using anyone of the methods described in the literature; for instance, the phosphates can be prepared by mixing the carbonates, oxides, hydroxides, nitrates, etc. of the respective metals with the orthophosphoric $H_3PO_4$, pyrophosphoric, methaphosphoric, orthophosphorous, hyphophosphorous, methaphosphorous, hypophosphoric acids, or with the ammonium phosphate or with the phosphorus pentoxide and subsequent calciiiation of the products. The precursors of these compounds can be obtained by means of precipitation of the phosphates or phosphites dissolved in water with soluble salts of the metal of interest at different values of pH and subsequent precipitate calcination.

These compounds can be included in the catalyst formulation or they can be mixed with the catalyst at concentrations between 5 and 10%. In order to use the trap as an additive, that is, as a dual or free particle which is added to the commercial unit at the same point such as the fresh catalyst, it is required to produce particles of the same size such as that one of the phosphorus compounds, of materials such as alumina, silica, clays, magnesia, among other compounds the use of which will be obvious to the experts in the art.

The following examples are offered in order to illustrate the objectives and advantages of the present invention. However, they are not intended to limit the scope of the present invention.

EXAMPLE 1

A ultrastable zeolite sample Y (USY) was soaked with 1% of vanadium in the form of vanadium phenylacetonate dissolved in toluene; the sample was subjected to 300° C. in an oxygen atmosphere in order to remove the organic part. The thus treated zeolite was mixed in a mortar with 10% of barium pyrophosphate and the mixture was heated up to 720° C. in air having a water content of 20% during 100 hours. In order to compare the zeolite soaked with the vanadium it was submitted to the same process in the absence of trap. The crystallinity still remaining (C/C°) in the zeolites is assessed by comparing the microprobe volume calculated according to Lippens, B. C. and de Boer, J. H., *Journal of catalysis* 4 319–23 (1965), against the zeolites without any treatment.

The destruction percentage is defined as 100 minus the crystallinity remaining in the sample after the treatment, and the protection percentage is calculated by taking as 100% the zeolite destruction value without trap exposed to the same conditions such as the sample.

TABLE 1

| Sample | C/C° × 100 | % Destr. | % Prot. |
|---|---|---|---|
| USY | 100 | | |
| USY 1% V, 100 hours | 77.80 | 22.20 | |
| USY 1% V, 250 hours | 68.07 | 31.93 | |
| 0.90 (USY 1% V) + 0.10 $Ba_2P_2O_7$, 100 hours | 87.66 | 13.34 | +39.90 |
| 0.95 (USY 1% V) + 0.05 $Ba_2P_2O_7$, 250 hours | 81.45 | 18.55 | +60.09 |

The obtained results are offered in the above Table 1 and they show that the zeolite impregnated with 1% vanadium in the presence of 10% of barium pyrophosphate is destroyed to a lesser extent than in the absence of the trap. Thus, under these conditions, the trap protects the zeolite in an extent of 39.9%.

In order to corroborate these results the test was repeated by using only 5% of trap during 250 hours. As control, the impregnated zeolite, without trap, was subjected to the same process. The results shown in Table 1 corroborate the barium pyrophosphate efficiency as an agent immobilizer for the vanadium in similar conditions to those ones prevailing in the regeneterator of an CCU.

EXAMPLE 2

A homogeneous fraction of the mixture with 95% of zeolite impregnated with vanadium and 5% of barium pyrophosphate treated for 250 hours in air with 20% of water, was observed under sweep electron microscope and analyzed by means of microprobe EDX (Energy Dispersive X rays). In order to differentiate the trap particles from those ones of zeolite, use was made of the detector of retrodispersed electrons, making use of the great difference in atomic number existing between the barium and the other present elements.

There were selected two zeolite points and three points of the trap and it was determined at each one of them, the intensity of the line Lal for the barium and the signal Ka for the elements Al, Si, P and V; the results are shown in the Tables 2 through 4. The relative intensity of the signal is assessed by taking as 100% the sum of the signals for the aforec tied five elements; the efficiency factors were not determined. For that reason, the value does not exactly correspond to the content of the element in the sample under analysis, but it allows to establish a comparison between samples.

If it is observed the signal relative intensity for the vanadium (values in boldface) in the five (5) points investigated, it can be concluded that the vanadium is accumulated preferentially on the barium pyrophosphate trap. It is important to make it conspicuous that the mixture was prepared by using the zeolite impregnated with vanadium (95% m)+the trap (5%m); in this mixture, all of the vanadium is found on the zeolite, because of which the obtained results point out to us that the vanadium migrates from the zeolite to the trap wherein it is immobilized and corroborate also the great mobility and efficiency of the trap under the severe conditions of the regenerator of a commercial unit.

TABLE 2

Analysis by means of microprobe on the zeolite, point 1

| Element | Range KeV | Intensity | Relative Int. |
|---|---|---|---|
| Al | 1.36 a 1.58 | 9508 | 8.96% |
| Si | 1.60 a 1.86 | 95582 | 90.08% |
| P | 1.84 a 2.18 | 0 | 0 |
| Ba | 4.28 a 4.68 | 156 | 0.15% |
| V | 4.74 a 5.16 | 861 | 0.81% |

TABLE 3

Analysis by means of microprobe on the zeolite, point 2

| Element | Range keV | Intensity | Relative Int. |
|---|---|---|---|
| Al + Si | 1.36 a 1.88 | 151466 | 99.14% |
| P | 1.84 a 2.18 | 0 | 0 |
| Ba | 4.28 a 4.68 | 156 | 0.15% |
| V | 4.74 a 5.16 | 1315 | 0.86% |

TABLE 4

Analysis by means of microprobe on the trap

| | Range keV | Point 3 | Relat. Int. 3 | Point 4 | Relat. Int. 4 | Point 5 | Relat. Int. 5 |
|---|---|---|---|---|---|---|---|
| Al | 1.36–1.58 | 0 | 0 | 3135 | 3.30% | 1021 | 1.99% |
| Si | 1.60–1.86 | 23803 | 26.87% | 23156 | 24.36% | 16166 | 31.57% |
| P | 1.84–2.18 | 8191 | 9.25% | 8191 | 8.62% | 2339 | 4.57% |
| Ba | 4.28–4.68 | 34496 | 38.94% | 38496 | 40.49% | 19104 | 37.30% |
| V | 4.74–5.16 | 22091 | 24.94% | 22091 | 23.24% | 12584 | 24.57% |

What is claimed is:

1. A catalytic composition useful in the catalytic-cracking of hydrocarbons containing vanadium as a contaminant, the composition comprising:

a zeolite as matrix, and an agent causing inactivation of the vanadium, wherein said agent comprises a compound having a formula selected from the group consisting of $M(PO_3)_2$, $M_2(P_2O_7)$, $M_3(PO_4)_2$, $M_{10}(OH)_2(PO_4)_6$, $M(H_2PO_4)_2$, $MHPO_4$, $3M_3(PO_4)_2 \cdot MCO_3$, $M(H_2PO_2)_2$, $MHPO_3$, $M(PO_2)_2$, $M_2P_2O_6$, and $A(PO_3)_3$, wherein M stands for a cation of a bivalent metal selected from the group consisting of Be, Mg, Ca, Sr, Ba, Zn, Cd and Pb, and A stands for a cation of a trivalent metal selected from the group consisting of Al, Ga, In, As, Sb, Bi, La, Ce, Pr, Nd, Pm, Sm, Eu, and Gd, and wherein the vanadium is stabilized as at least one compound containing vanadium in V(IV) or V(V) oxidation states.

2. The catalytic composition of claim 1, wherein said agent causing vanadium inactivation comprises from about 5 to 10% by weight of the total mass of said catalytic composition.

3. The catalytic composition according to claim 2, wherein the agent causing vanadium inactivation is a barium pyrophosphate having the formula $Ba_2P_2O_7$.

4. The catalytic composition according to claim 2, wherein the agent causing vanadium inactivation is a barium hydroxyapatite having the formula $Ba_{10}(OH)_2(PO_4)_6$.

5. The catalytic composition according to claim 2, wherein the agent causing vanadium inactivation is a barium methaphosphate having the formula $Ba(PO_3)_2$.

6. The catalytic composition according to claim 1, wherein the agent causing vanadium inactivation is a barium pyrophosphate having the formula $Ba_2P_2O_7$.

7. The catalytic composition according to claim 1, wherein the agent causing vanadium inactivation is a barium hydroxyapatite having the formula $Ba_{10}(OH)_2(PO_4)_6$.

8. The catalytic composition according to claim 1, wherein the agent causing vanadium inactivation is a barium methaphosphate having the formula $Ba(PO_3)_2$.

9. A catalytic composition useful in the catalytic-cracking of hydrocarbons containing vanadium as a contaminant, the catalytic composition comprising:

a catalytic-cracking catalyst, and a second component, which operates as an agent causing vanadium inactivation, or as a trap for the retention thereof, the component comprising a compound having a formula selected from the group consisting of $M(PO_3)_2$, $M_2(P_2O_7)$, $M_3(PO_4)_2$, $M_{10}(OH)_2(PO_4)_6$, $M(H_2PO_4)_2$, $MHPO_4$, $3M_3(PO_4)_2 \cdot MCO_3$, $M(H_2PO_2)_2$, $MHPO_3$, $M(PO_2)_2$, $M_2P_2O_6$, and $A(PO_3)_3$, wherein M stands for a cation of a bivalent metal selected from the group consisting of Be, Mg, Ca, Sr, Ba, Zn, Cd and Pb, and A stands for a cation of a trivalent metal selected from the group consisting of Al, Ga, In, As, Sb, Bi, La, Ce, Pr, Nd, Pm, Sm, Eu, and Gd, and wherein the vanadium is stabilized as at least one compound containing vanadium in V(IV) or V(V) oxidation states.

10. The catalytic composition of claim 9, wherein said second component is supported on at least one material selected from the group consisting of alumina, silica, magnesium oxide, titanium oxide, zirconium oxide, aluminum phosphate, aluminosilicates, zeolites, kaolin, sepiolite and clays.

11. The catalytic composition according to claim 10, wherein the agent causing vanadium inactivation is a barium pyrophosphate having the formula $Ba_2P_2O_7$.

12. The catalytic composition according to claim 10, wherein the agent causing vanadium inactivation is a barium hydroxyapatite having the formula $Ba_{10}(OH)_2(PO_4)_6$.

13. The catalytic composition according to claim 10, wherein the agent causing vanadium inactivation is a barium methaphosphate having the formula $Ba(PO_3)_2$.

14. The catalytic composition according to claim 9, wherein the agent causing vanadium inactivation is a barium pyrophosphate having the formula $Ba_2P_2O_7$.

15. The catalytic composition according to claim 9, wherein the agent causing vanadium inactivation is a barium hydroxyapatite having the formula $Ba_{10}(OH)_2(PO_4)_6$.

16. The catalytic composition according to claim 9, wherein the agent causing vanadium inactivation is a barium methaphosphate having the formula $Ba(PO_3)_2$.

* * * * *